Patented Feb. 19, 1935

1,991,819

UNITED STATES PATENT OFFICE 1,991,819

ACID LEACHING

Perley G. Nutting, Washington, D. C., assignor, by mesne assignments, to M. Jeannette Kaylor, Hagerstown, Md.

No Drawing. Application December 19, 1932, Serial No. 648,022

10 Claims. (Cl. 252—2)

This invention is a process or method of limiting or otherwise controlling the chemical action between an acid and a material being washed or leached therewith, which material contains ingredients which are sources of cations when subjected to the acid treatment. While the invention is capable of general application within the limits thus defined, it is of particular utility when applied to the acid treatment of clays for the purpose of rendering said clays chemically active as filtering and/or decolorizing media for oils, syrups, and the like.

It is well known that the naturally active bleaching clays such as Floridin and Attapulgus are far surpassed in bleaching power by the acid treated clays of the bentonite type such as that marketed under the trade name of Filtrol, which is produced from Arizona bentonite, the imported Bavarian clays and by numerous other acid treated American bentonites. Acid treated clays, however, suffer from four chief defects when used as bleaching or decolorizing agents in connection with oils: (1) They are commonly diluted with considerable amounts of ordinary clay not activatable; (2) The acid treatment may be carried too far (reducing the clays to the less active silica gel formation) or not far enough; (3) The washing following acid treatment may be incomplete or done with hard water (partly reversing the effect of the acid leach); or (4) The properly selected and prepared clay may be deteriorated by exposure to oil vapors or other impure air subsequent to preparation and prior to its contact with the oil.

As a result of numerous experiments directed to eliminating the defects accruing from the acid step of subjecting the clay to an acid bath or leach, I have discovered a new principle by which the action of the acid on the clay is automatically stopped at the point which will insure a maximum degree of activation of the clay. My experiments have proven that this result may be obtained independently of the degree of concentration of the acid, the length of time the reacting components are allowed to remain in contact with each other, the relative percentage of activatable and inert material in the clay, moisture content of the clay and other variable factors which have heretofore made extremely difficult the commercial activation of clays involving acid treatment in a manner to give uniform results.

The principle I have discovered by which the chemical action between the acid and the mass being treated may be limited or otherwise controlled is applicable generally to all cases wherein the resulting reaction between the acid and the clays being treated yields or sets free cations and, as hereinbefore stated, is particularly advantageous when practiced in connection with processes involving the acid treatment of clays wherein the degree of activation of the clay is dependent upon the extent of reaction between the acid and the clay.

I have discovered that by providing a source of cations which may be rendered readily available to the leaching acid during the leaching operation, that the reaction between the acid and the material being leached is automatically halted or terminated at the point of maximum activation of the clay. I am unable to advance any theory upon which the phenomena I have discovered may be based but I have proven by numerous experiments that the presence of a source of readily available cations during the leaching operation will function in the manner stated.

In order that it may be readily understood how my invention may be applied to processes involving the acid treatment of clays, it may be here stated that the present practice in this respect involves generally subjecting a clay which has been previously roasted or not, depending upon the character of the clay, to an acid bath during which time the mass is preferably stirred or agitated. Any suitable mineral acids, such as hydrochloric acid, nitric acid or the like may be used and after subjecting the mass to such treatment the spent acid is run off with the dissolved clay constituents therein and the remaining mass thoroughly washed with water and the activated clay suitably dried. My improvement is such that it may be combined with the conventional acid treatment processes now being used and comprises adding to either the clay to be treated or the leaching acid, or both, a source or sources of cations independent of such sources as may be inherently present in the mass of clay to be treated.

The added source of cations may conveniently take the form of a metal salt or salts when added to the leaching acid, or a composition including a metal in a form more susceptible to action by the acid than the metal compounds inherently present in the clay being treated. For instance, I may employ oxides (like CaO) or iron filings and the like and mix the same or sprinkle the same with the mass of clay to be treated, or I may add a salt such as a chloride or sulphate or nitrate to the leaching acid prior to or during the leaching step.

It is to be noted that while I may use any of the salts mentioned in connection with any of the acids enumerated, I preferably select a salt of the leaching acid in order that any chemical reaction between a weak salt and a stronger acid will not result in the production of products which may, under certain conditions, be obnoxious. For instance, I have found that sodium chloride (NaCl) may be employed and if this is used in connection with a sulphuric acid leach it will result in the formation of objectionable chlorine fumes. However, the reaction between the sulphuric acid and the clay would be stopped at the desirable point to yield a clay of maximum activation. Other materials which I may mention by way of example as having been found to function in the manner stated are ferric chloride, aluminum chloride, magnesium chloride, aluminum sulphate, aluminum nitrate and similar salts.

As indicated above, it is not essential or necessary to employ a salt as a source of cations, as I have found that the use of metal compounds such as oxides and the like, or metals themselves, function equally well to produce the desired reaction, it being noted in this connection that the reaction between the leaching acid and the metal or oxide of metal added to the leaching bath results in the production of cations in addition to those which are normally provided or set free as a result of the reaction between the acid and the metal compounds of the clay. It may be here stated that I have found it desirable, although not necessary, in using a metal oxide rather than a salt, to choose a metal or a metal compound which is more susceptible to the action of the acid than the metal or metal compounds present in the clay, since by so choosing the metal or metal compound I am assured of an excess of cations throughout the entire leaching process.

In order to demonstrate the advantages which may be derived from the practice of my invention, particularly with reference to the acid treatment of clays, I give below a table showing the relative activation or degree of relative efficiency of clays which have been subjected to the usual acid treatment and to an acid treatment involving the introduction of excess cations according to my present invention, namely:

|  | Untreated | Dialyzed | Acid bleached | Cation treated |
| --- | --- | --- | --- | --- |
| Floridin clay | 0.7 | 1.2 | 0.6 | 1.8 |
| Bentonite (Av.) | 0.5 | 0.6 | 1.5–1.8 | 2.0 |
| Glauconite | 1.2 | 1.2 | 1.0–1.7 | 2.0 |
| English earth | 1.2 |  | 1.6–1.7 | 1.9 |
| Death Valley clay | 1.8 | 1.6 | 1.2 | 2.0 |

In order to more thoroughly appreciate the figures given in the table above it may be here stated that these figures express the ratio between the length of a column of oil which has been reduced to a water white condition to the length of a column of equal cross-section of activated clay. In other words, if a column of clay one inch in height will filter a column of oil of equal cross-section and two inches in height to a water white condition, the ratio as expressed in the above table is 2.0. Incidentally, I have found as a result of numerous experiments that the ratio 2.0 expresses the approximate maximum of activation which may be expected from the present known clays.

From the foregoing discussion it will be apparent that I have discovered a new principle for controlling or limiting the action of a leaching acid on a clay containing ingredients capable of producing cations during the leaching operation, which process consists generally in providing means for insuring a readily available source of cations during the leaching reaction independent of sources of cations which may be inherently present in the mass being leached, and although I am unable to give any valid reason or advance any practical theory to which the phenomena may be attributed, I have discovered that the presence of said excess cations functions to automatically suspend or stop the action of the acid on the clay at a point which insures a maximum degree of activation of the clay.

While the proportion of the cation source or sources to the clay depends upon the particular character of the clay being treated and varies widely depending upon the type of the clay, I give by way of example the following data with respect to glauconite and the quantities and proportions involved in the treatment thereof which yielded the results given in the preceding table, namely:

|  | Grams |
| --- | --- |
| Glauconite | 1104 |
| Sulphuric acid (20%) | 480 |
| $FeSO_4$ (cation source) | 350 |

As a result of including the 350 grams of ferrous sulphate ($FeSO_4$) as a source of cations in addition to the cations inherently present in the clay, the reaction between the acid and the clay automatically stopped at substantially the point of maximum activation of the clay.

Having thus described my invention, what I claim as new is:

1. In a process of acid treating clay to render it chemically active as a filtering and decolorizing agent for oils, syrups and the like, and including leaching the clay with an acid capable of reacting with the metal components of the clay, the step of providing a source of cations independent of cation sources inherently present in the mass to be treated and in an amount sufficient to arrest the reaction between the acid and the clay at substantially the time at which the clay has reached the maximum degree of activation, and rendering said independent source of cations readily available for reaction with the leaching acid while the leaching step is in progress.

2. In a process of acid treating clay to render it chemically active as a filtering and decolorizing agent for oils, syrups and the like, and including leaching the clay with an acid capable of reacting with the metal components of the clay, the steps of adding to one of the components of the leaching reaction a source of cations in an amount sufficient to arrest the reaction between the acid and clay at substantially the time at which the clay has reached the maximum degree of activation, and concurrently subjecting the clay and said source of cations to action of the acid.

3. In the art of activating clays by acid leaching for bleaching and decolorizing purposes, the method of controlling the reaction between the clay and acid comprising contacting a natural activatable clay with a suitable acid in the presence of a readily available source of cations in addition to the cation sources inherently present in the clay and in an amount sufficient to arrest the reaction between the acid and the clay at substantially the time at which the clay has reached the maximum degree of activation, and then separating the clay and spent acid and washing and drying the clay.

4. In a process of acid treating clay to render it chemically active as a filtering and decolorizing agent for oils, syrups and the like, and including leaching the clay with an acid capable of reacting with the metal components of the clay, the steps of adding to one of the components of the leaching reaction a source of cations comprising a metal in a form more susceptible to reaction with the acid than the metal components of the clay, in an amount sufficient to arrest the reaction between the acid and clay at substantially the time at which the clay has reached the maximum degree of activation, and concurrently subjecting the clay and said source of cations to action of the acid.

5. In a process of acid treating clay to render it chemically active as a filtering and decolorizing agent for oils, syrups and the like, and including leaching the clay with an acid capable of reacting with the metal components of the clay, the steps of adding to one of the components of the leaching reaction a source of cations comprising a metal oxide in an amount sufficient to arrest the reaction between the acid and clay at substantially the time at which the clay has reached the maximum degree of activation, and concurrently subjecting the clay and said source of cations to action of the acid.

6. In a process of acid treating clay to render it chemically active as a filtering and decolorizing agent for oils, syrups and the like, and including leaching the clay with an acid capable of reacting with the metal components of the clay, the steps of adding to one of the components of the leaching reaction a source of cations comprising a metal salt in an amount sufficient to arrest the reaction between the acid and clay at substantially the time at which the clay has reached the maximum degree of activation, and concurrently subjecting the clay and said source of cations to action of the acid.

7. In the process of acid treating clay to render it chemically active as a filtering and decolorizing agent for oils, syrups and the like and including leaching the clay with an acid capable of reacting with the metal components of the clay, the step of adding to the leaching acid a source of cations in addition to the cations inherently present in the clay and in an amount sufficient to arrest the reaction between the acid and clay at substantially the time at which the clay has reached the maximum degree of activation.

8. In the process of acid treating clay to render it chemically active as a filtering and decolorizing agent for oils, syrups and the like and including leaching the clay with an acid capable of reacting with the metal components of the clay, the steps of adding to the clay a source of cations in addition to the cations inherently present in the clay and in an amount sufficient to arrest the reaction between the acid and clay at substantially the time at which the clay has reached the maximum degree of activation.

9. For use in the acid leaching of clays to render them active filtering and decolorizing agents for oils, syrups and the like, a mixture of a natural activatable clay and a source of cations in an amount sufficient to arrest the reaction between the clay and a leaching acid at substantially the time at which the clay has reached a maximum degree of activation.

10. For use in the acid leaching of clay, a leaching fluid comprising an acid capable of reacting with the metal components of a natural clay to render the same active as a filtering and decolorizing agent for oils, syrups and the like, and a source of cations in an amount sufficient to arrest the reaction between the acid of the fluid and a clay for the treatment of which the fluid has been designed, at substantially the time at which the clay has reached the maximum degree of activation.

PERLEY G. NUTTING.